United States Patent [19]

Wassilieff et al.

[11] 3,942,475

[45] Mar. 9, 1976

[54] DEVICES FOR OESTRUS DETECTION

[75] Inventors: Alexander Wassilieff, Palmerston North; Patrick Shannon, Hamilton, both of New Zealand

[73] Assignees: Delta Plastics Limited, Palmerston North; New Zealand Dairy Board, Wellington, both of New Zealand

[22] Filed: Sept. 26, 1974

[21] Appl. No.: 509,408

[52] U.S. Cl. .................................................. 119/1
[51] Int. Cl.² .......................................... A01K 29/00
[58] Field of Search ........................................ 119/1

[56] References Cited

UNITED STATES PATENTS

| | | | |
|---|---|---|---|
| 3,076,431 | 2/1963 | Rule et al. | 119/1 |
| 3,158,133 | 11/1964 | Larson | 119/1 |
| 3,205,857 | 9/1965 | Larson | 119/1 |

*Primary Examiner*—Hugh R. Chamblee

[57] ABSTRACT

An oestrus detection device comprising an indicator carrier of flexible material which is adapted for attachment to the top rear central section of an animal between its hip-bones. An indicator is detachably mounted on the indicator carrier, and is made of flexible coloured flowable material connected through a fine orifice to at least one channel. The construction and arrangement is such that when the indicator-mounted carrier is mounted on a cow or other female animal and mating technique by a second animal is made, pressure applied by the second animal upon the sachet forces the differently-coloured material to flow along the channel or channels of the indicator for observation by a farmer.

5 Claims, 5 Drawing Figures

DEVICES FOR OESTRUS DETECTION

This invention relates to devices designed for use in the oestrus detection of animals.

It has been known for some time that the problems related to oestrus detection in breeding and dairy cows can cause the farmer considerable trouble when endeavouring to achieve a balanced calving and consequent production programme both in dairy and beef herds. By some means the farmer must be able to ascertain when a cow is on "heat" so that artificial breeding techniques or normal mating can be introduced at the right time. Certain types of automatic triggering indicators, which are attached to the top rear section of the animal between the hip-bone and spine have been used. These are set off by pressure from the chest or brisket of other animals when "riding" the animal on "heat."

The present invention is concerned with an oestrus detection device having such a construction that it provides a positive visual indication of a sufficiently large area, so that it can be seen at a distance, which is not easily triggered by contact with other animals during usual handling in shed or farm conditions, and which can be replaced with different coloured indicators for colour coding.

Generally the invention consists of an oestrus detection device comprising an indicator carrier of flexible material adapted for attachment to the top rear central section of an animal between its hip-bones, and an indicator detachably mounted on the indicator carrier, the indicator being made of flexible coloured material and having a sachet of differently-coloured flowable material connected through a fine orifice to at least one channel, the construction and arrangement being such that when the indicator-mounted carrier is mounted on a cow or other female animal and mating technique by a second animal is made, pressure applied by the second animal upon the sachet will force the differently-coloured material to flow along the channel or channels of the indicator for observation by a farmer.

In further describing the invention reference will be made hereinafter to the accompanying drawings, in which.

Figure 1:
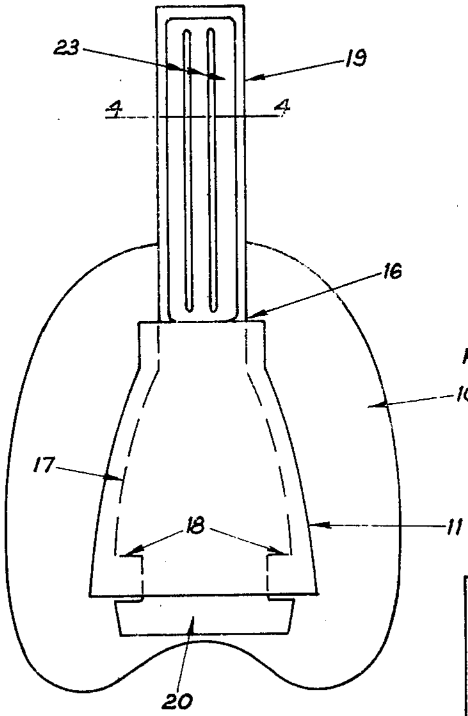
FIG. 1 is an elevation of the device.
Figure 2:
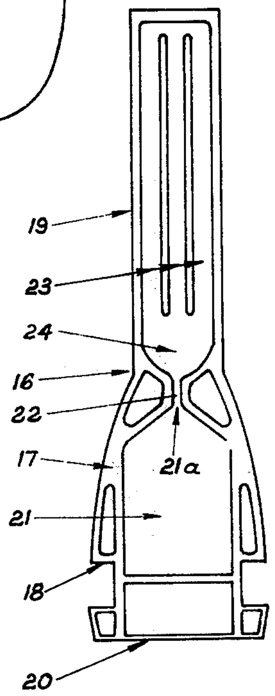
FIG. 2 is an elevation of the indicator part of the device.
Figure 3:
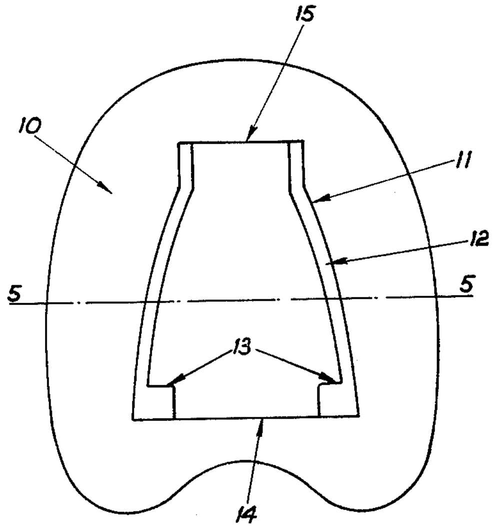
FIG. 3 is an elevation of the carrier part of the device.
Figure 5:
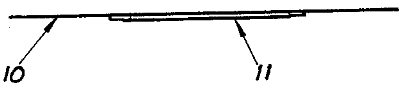
FIG. 5 is a cross-section taken on the line 5-5 of FIG. 3.
Figure 4:
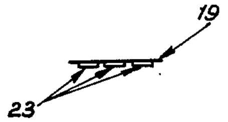
FIG. 4 is a cross-section taken on the line 4-4 of FIG. 1.

In giving effect to the invention, as a preferred embodiment, the carrier 10 is made from a flexible material. The underside of the carrier is processed at desired areas with a suitable adhesive which when activated or other presented will be the means by which the carrier is detachably secured to the animal.

This carrier is provided with an open pocket or sleeve section 11, of a shape widening towards the base of the sleeve. The sleeve is formed by an area of flexible material attached to the base sheet 10 along its vertical marginal edges 12, but at its bottom corners, there is an increased area which provides internal shoulders 13. Therefore two openings 14, 15 of the sleeve are provided of different sizes, one opening 14 being wider to admit the indicator to receive and obscure its transparent sachet, and the other opening 15 to provide the channelled part of the indicator to project from the carrier. The sleeve is made of an opaque flexible material.

The indicator 16 also formed of flexible sheet is of an elongate shape having a section 17 of a shape so as to be retained within the shaped sleeve 11. This section 17 includes side wings 18 which are designed to co-operate with the shoulders 13 in the sleeve 11 and so prevent the indicator from sliding back through the opening 14 of the sleeve when the device is in operation. From its section 17, the shape of the indicator is given a tail 19 of some length. The section 17 and tail 19 are formed out of a single piece of the coloured sheet, such as red coloured sheet, and provides the base of the indicator. Preferably the indicator is also formed with an end bar 20 of a width greater than that of wider opening 14 of the sleeve 11.

Upon this base is provided the sachet 21, the calibrated orifice 22, the equalising chamber 24 and the multi-channelled part 23. This is given effect to by bonding a suitably shaped transparent flexible sheet to the coloured flexible base sheet of the indicator. The sachet 21 has an opening 21a connecting through the orifice 22, which is specially calibrated, to the respective end of the various channels 23 via an equalising chamber 24. These channels run in a parallel alignment down the tail 19 or extension of the indicator. The differently-coloured, such as yellow, flowable liquid is inserted into the sachet 21 and which is subsequently hermetically sealed.

After securing the carrier 10 to the back of an animal at the position indicated above, the indicator 16 is slipped through the wider opening 14 into the carrier's sleeve 11, the flexible wings 18 being lightly forced through the somewhat narrower opening will return to their original shape and thereby retain the indicator 16 inside the carrier's sleeve 11 with the transparent sachet being obscured by the sleeve of the carrier 10, and the multi-chambered strip 19 protruding through the smaller opening 15 of the sleeve 11 so as to be visible, as indicated in FIG. 1.

When the animal is mounted and prolonged or repeated pressure applied by another animal, the coloured liquid in the sachet 21 will be transferred via the calibrated orifice 22 into equalising chamber 24, whose function is to delay and evenly distribute the coloured liquid into the multi-channelled part 23, thereby providing positive visual indication of the animal being in "season" and ready for insemination or mating.

As normally a cow will not readily stand for mounting by another animal when it is not in "season" only limited pressure is applied to the device by the "riding" animal and it will not show a positive reaction, i.e. fill the transparent indicator strip 19 with coloured liquid thereby not giving any indication of the animal being on "heat" or ready for insemination or mating.

When the animal is inseminated or mated the indicator 16 can be simply removed by pulling the indicator out of the carrier through the opening 14. The carrier is now to accept a new differently coloured indicator for subsequent purposes.

To summarize, features of this invention:

1. The sleeve 11 which serves for a certain period as a holder only for an indicator 16.
2. The ease of placement, removal and replacement of an indicator, thereby facilitating colour coding, where a differently coloured indicator is subsequently used.

3. The multi-channelled indicator strip 19 of the indicator gives a large visual area.
4. The calibrated orifice 21a to restrict movement of the coloured liquid from the sachet 21 to the indicator channelled strip if not sufficient prolonged pressure is applied.
5. The equalising chamber 24 to delay and evenly distribute the coloured liquid into the multi-channelled part 23.

What is claimed is:

1. An oestrus detection device comprising an indicator carrier of flexible material adapted for attachment to the back of an animal between its hip-bones, an area of flexible material attached to the carrier to form a sleeve which widens toward one end opening, a pair of internal shoulders at the wider end opening, an indicator detachably mounted to the carrier and made of a flexible coloured material having a sachet of differently-coloured flowable material connected through a fine orifice to at least one channel, side wings incorporated with said indicator which cooperates with the internal side shoulders of the sleeve to prevent the indicator sliding from the sleeve, the construction and arrangement being such that when the indicator-mounted carrier is mounted on a cow or other female animal and mating technique by a second animal is made, pressure applied by the second animal upon the sachet will force the differently-coloured material to flow along the channel or channels of the indicator which extends through the sleeve from its narrower opening and beyond the carrier for observation.

2. An oestrus detection device as claimed in claim 1 wherein the back of the carrier is processed in desired areas with an adhesive which when activated will be the means by which the carrier is detachably secured to the animal.

3. An oestrus detection device as claimed in claim 2 wherein the area of flexible material forming the sleeve is attached to the carrier by bonding along its side edges, with increased areas of bonding at the wider end opening to provide the internal shoulders.

4. An oestrus detection device as claimed in claim 1 wherein the indicator has an end bar of a width greater than the wider opening of the sleeve.

5. An oestrus detection device as claimed in claim 4 wherein the sachet area and the multi-channelled strip, the fine connecting orifice and the equalising chamber are provided in a transparent sheet bonded upon a base sheet of the indicator, the orifice being calibrated so as to restrict movement of liquid from the sachet to the channels of the strip if not sufficient prolonged pressure is applied to the sachet.

* * * * *